United States Patent [19]

Princen et al.

[11] Patent Number: 5,384,052
[45] Date of Patent: Jan. 24, 1995

[54] PREPARATIVE TECHNIQUE TO CONCENTRATE OR ISOLATE SURFACTANT FROM OIL/WATER EMULSIONS

[75] Inventors: H. M. Princen, Flemington; Peter O. Staffeld, Mount Laurel, both of N.J.

[73] Assignee: Mobil Oil Corporation, Fairfax, Va.

[21] Appl. No.: 36,296

[22] Filed: Mar. 24, 1993

[51] Int. Cl.⁶ .............................................. B01D 21/26
[52] U.S. Cl. ................................... 210/787; 210/708; 210/710; 252/320
[58] Field of Search ........................ 210/708, 710, 787; 252/319, 320

[56] References Cited

U.S. PATENT DOCUMENTS 4,539,100  9/1985  Ronden ................................. 210/708
4,938,876  7/1990  Ohsol .................................... 210/708

Primary Examiner—Robert A. Dawson
Assistant Examiner—David Reifsnyder
Attorney, Agent, or Firm—Alexander J. McKillop; George W. Hager, Jr.; Charles A. Malone

[57] ABSTRACT

This invention is directed to a preparative technique for concentrating or isolating a surfactant from an oil/water emulsion. First, a an emulsion or sludge sample containing surfactants is separated into separate oil, water and solid phases. Thereafter, water droplets are injected into the oil phase. The water droplets fall through the oil phase, causing surfactant in the oil phase to adhere to said droplets which form a high-internal-phase-ratio (HIPR) water-in-oil emulsion that is rich in surfactants. This emulsion is subsequently separated into an oil and a water phase. The separated surfactant-rich oil phase is then analyzed to obtain information concerning the surfactant.

7 Claims, 1 Drawing Sheet

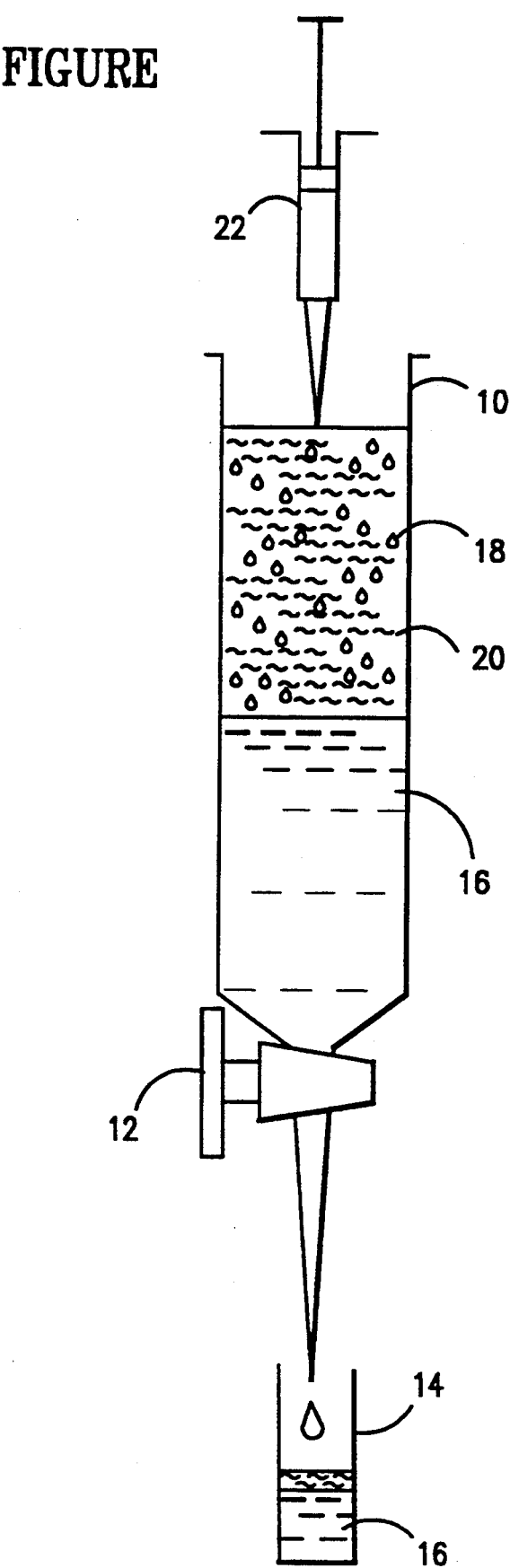
FIGURE

PREPARATIVE TECHNIQUE TO CONCENTRATE OR ISOLATE SURFACTANT FROM OIL/WATER EMULSIONS

FIELD OF THE INVENTION

This invention relates to procedures for concentrating or separating a surfactant from an oil phase contained in a water-in-oil emulsion.

BACKGROUND OF THE INVENTION

Waste products are produced during the refining of petroleum, for example, heavy oily sludges, biological sludges from wastewater treatment plants, activated sludges, gravity separator bottoms, storage tank bottoms, oil emulsion solids including slop oil emulsion solids or dissolved air floatation (DAF) float from floatation separation processes. Waste products such as these may create significant environmental problems because they are usually extremely difficult to convert into more valuable, useful or innocuous products. In general, they are usually not readily susceptible to emulsion breaking techniques and incineration, which requires the removal of substantial amounts of water typically present in these sludges, would require elaborate and expensive equipment. For this reason, they have often been disposed of in the past by the technique known as "land farming" by which the sludge is worked into the land to permit degradation by bacterial action. Resort to these methods has, however, become more limited in recent years with increasingly stringent environmental controls and increases in the amount of such waste products produced in refineries. In particular, the use of land farming is likely to encounter more stringent regulation in the future because of the potential for pollution, both of ground water and the air.

Emulsions and sludges in wastewater facilities increase treatment costs. Increased data regarding the causes of sludge and emulsion formation could lead to methods to reduce these costs.

Emulsions in refinery processes lead to sludge generation, high costs for recovering slop oils, and other problems. Although sludge yields per barrel of oil are low, the absolute quantities produced are relatively high due to a high crude oil throughput. This has led to legislation calling for extremely costly disposal methods. A clear need for an improved understanding of the refinery sludge generation problem is now apparent.

Surfactants (surface active agents) stabilize emulsions and preferentially collect at an oil/water interface. Sludges are formed when finely dispersed solids collect at the interface, further stabilizing the emulsion. Isolating or concentrating a sample of the surfactants and solids is necessary for understanding the fundamental forces that stabilize emulsions. Although solids isolation is relatively simple, isolation or concentration of the surfactants remains a problem. An understanding of the fundamental emulsion stabilization forces will suggest methods to destabilize emulsions.

Therefore, what is needed is a method of isolating or concentrating the surfactant(s) from a sludge or an oil/water emulsion so that information can be obtained about the surfactant(s) which in turn can be used to destabilize the emulsion.

SUMMARY OF THE INVENTION

This invention is directed to a preparative analytical technique or method to isolate or concentrate surfactant(s) from an oil/water emulsion. In the practice of this invention, a sample of sludge obtained as a by-product of an oil refinery processing operation is subjected to centrifugation in order to obtain separate oil, water and solid phases. Afterwards, the solid and water phases are separated from the oil phase. The oil phase contains surfactants that are either inherent ("natural") or surfactants resultant from, e.g., a surfactant flooding operation in the recovery of oil or hydrocarbonaceous fluids from a reservoir.

Thereafter, droplets of water are injected into the oil phase. The water droplets fall through the oil phase and the surfactants adsorb at the surface of the water droplets, forming a high-internal-phase-ratio (HIPR) water-in-oil emulsion at the bottom. The relatively small amount of oil in this emulsion is thereby much enriched in surfactants. Subsequently, the emulsion is separated from the upper oil phase. The HIPR emulsion thereafter is subjected to centrifugation and is broken into a water and a surfactant-rich oil phase. Next, the surfactant-rich oil phase is separated from the water and the surfactant is then analyzed by methods known to those skilled in the art, e.g. high pressure liquid chromatography (HLPC), spectroscopic methods, nuclear magnetic resonance, and IR sprectroscopy. The surfactant-poor oil phase may be subjected to this process several more times to concentrate additional surfactant.

It is therefore an object of this invention to provide for a method of obtaining a surfactant from an emulsion for analysis and study which study can impart information regarding the formation of emulsions and sludges in refinery wastewater.

It is another object of this invention to provide for a method to obtain information about a surfactant for studying the formation of emulsions and sludges generated during the refining of crude oils.

It is yet another object of this invention to provide for a technique to concentrate or isolate a surfactant from an oil/water emulsion and obtain information regarding the formation of said emulsion so as to minimize refinery operating costs.

It is a further object of this invention to provide for a preparative technique to concentrate or isolate surfactants from an oil/water emulsion to obtain information regarding the formation of said sludges so as to reduce the cost of disposing of said sludges.

It is yet a further object of this invention to provide for a technique to obtain increased information regarding a surfactant which stabilizes an emulsion and leads to the formation of sludges in conjunction with fines which information can be used to decrease the cost of recovering slop oils resulting from a crude oil refinery process.

It is an even still further object of this invention to concentrate or isolate a sample of surfactants and solids contained in a sludge so as to understand the fundamental forces stabilizing emulsions and subsequently suggest methods to destabilize said emulsions.

BRIEF DESCRIPTION OF THE FIGURE

The FIGURE is a schematic representation of the method wherein injected water droplets fall through an oil phase to form a concentrated water-in-oil emulsion which emulsion is subsequently collected.

DESCRIPTION OF THE PREFERRED EMBODIMENTS

In the practice of this invention, a sample of sludge or an emulsion resultant from a wastewater treatment method or refinery treatment of crude oil is obtained. After obtaining the sludge sample, it is separated into separate oil, water and solid phases by centrifugation. Subsequently, the solids and aqueous phases are separated from the oil phase by means known to those skilled in the art such as suction or decantation. The oil phase contains the surfactant molecules of interest that are responsible for the sludge or emulsion.

Referring now to the drawing, water droplets 18 are injected by syringe 22 into an oil phase contained in separatory cylinder or column 10. Thereafter, the water droplets 18 sink by gravity and form a concentrated HIPR water-in-oil emulsion 16 at the bottom. This HIPR emulsion is subsequently drained into vial 14. Stopcock 12 prevents an undesired amount of the upper oil phase from entering vial 14. The HIPR water-in-oil emulsion in vial 14 is subsequently subjected to centrifugation and broken into a surfactant-rich oil phase and a water phase. The oil phase is thereafter separated from the water phase by suction, decantation, or other convenient means. The surfactant-rich oil phase can be analyzed using techniques well known to those familiar with the art to determine the properties of the surfactant. These methods would preferably include spectroscopic methods, such as nuclear magnetic resonance, and IR spectroscopy. If so desired surfactant can be isolated from the surfactant-rich oil phase by methods well known to those skilled in the art (e.g., HPLC). By analyzing the surfactant-rich oil phase, data can be obtained to determine the nature and quantity of the surfactant molecules so as to prescribe a method to break (or de-stabilize) emulsions which cause the sludge to form. With this information, methods may be developed to minimize sludge formation.

The surfactants are usually present in the oil phase. The apparatus as shown in the drawing is designed to generate a high-internal-phase-ratio (HIPR) water-in-oil emulsion, the oil phase of which is enriched in surfactants. As mentioned previously, water droplets sink through the oil phase to the bottom of separatory column or cylinder 10. Surfactants in the oil phase adsorb at the interface as the water droplets fall through the column. The HIPR emulsion which forms at the base of column 10 is composed of packed water droplets 18 in a continuous oil phase. The HIPR emulsion from column 10 as mentioned above is collected in vial 14 and separated via centrifugation to yield a surfactant-rich oil phase.

As used herein, surfactant or surface-active agent is defined to mean any compound that reduces surface or interfacial tension by adsorption at any interface, be it liquid/gas, liquid/liquid or liquid/solid (q.v.). They all function by the same basic mechanism and differ chiefly in their chemical structure and the nature of the surfaces involved. See *The Condensed Chemical Dictionary*, 9th Edition revised by Gessner G. Hawley. The surfactants of interest herein may be naturally occurring or result as a byproduct of petroleum refining or the recovery of oil from an underground formation by the use of surfactants.

Information obtained from the surfactant concentrated in, or isolated from the surfactant-rich oil phase can be used to understand the fundamental forces that stabilize emulsions. This understanding can lead to methods to destabilize these emulsions. Destabilized emulsions will prevent sludge formation and in the case of refinery operations reduce the high cost associated with recovering slop oils, among other problems. This information when used in conjunction with sludge and emulsion formation in a refinery and wastewater system can lead to novel methods to prevent such sludge and emulsion formation and thereby minimize treatment costs. Overall, reduced emulsion and sludge formation will result in lower operating costs both in wastewater treatment and refinery operation as well as a reduction in the costs associated with sludge disposal.

Although the present invention has been described with preferred embodiments, it is to be understood that modifications and variations may be resorted to without departing from the spirit and scope of this invention, as those skilled in the art readily understand. Such variations and modifications are considered to be within the purview and scope of the appended claims.

What is claimed is:

1. A preparative method to concentrate or isolate at least one surfactant from an oil/water emulsion or a sludge comprising:
   a) centrifuging a sludge or emulsion sample so as to obtain separate oil, water, and solids phases;
   b) separating the solids and water phases from the oil phase which oil phase contains a surfactant or surfactants;
   c) directing water droplets into the oil phase which droplets fall through the oil phase causing said surfactant to adhere to the droplets thereby forming a surfactant-poor oil phase and the droplets to form a high-internal-phase-ratio (HIPR) water-in-oil emulsion at the bottom which emulsion is enriched in surfactants;
   d) separating the HIPR emulsion of step c) from the surfactant-poor oil phase;
   e) centrifuging the HIPR emulsion from step d) into a water phase and a surfactant-rich oil phase; and
   f) separating the surfactant-rich oil phase from the water phase in step e).

2. The method as recited in claim 1 where the surfactant contained in the surfactant-rich phase of step f) is analyzed to obtain information regarding the formation of emulsions and sludges in refinery wastewater.

3. The method as recited in claim 1 where the surfactant contained in the surfactant-rich phase of step f) is analyzed to obtain information regarding the formation of emulsions and sludges derived as a by-product of refining crude oil.

4. The method as recited in claim 1 where the surfactant-rich oil phase of step f) is placed into a separatory column and steps c) through f) are repeated so as to obtain an oil phase further enriched in surfactant.

5. The method as recited in claim 1 where the surfactant-poor oil phase of step d) is placed into a separatory column and steps c) through f) are repeated so as to extract additional surfactant from the oil phase of step b).

6. The method as recited in claim 1 where the surfactant of step f) is analyzed to obtain data useful in understanding fundamental forces that stabilize emulsions.

7. The method as recited in claim 1 where the surfactant of step f) is analyzed to obtain data useful in understanding fundamental forces that stabilize emulsions which data can be used to destabilize emulsions and prevent sludge formation in refinery wastewater and process streams.

* * * * *